United States Patent Office 3,325,274
Patented June 13, 1967

3,325,274
METHOD OF GROWING SOYBEANS FOR
SEED YIELD
Irvin C. Anderson, Ames, Iowa, assignor to Iowa State
University Research Foundation, Inc., Ames, Iowa, a
corporation of Iowa
No Drawing. Filed Aug. 13, 1965, Ser. No. 479,626
13 Claims. (Cl. 71—2.6)

This application is a continuation-in-part of my co-pending application Ser. No. 330,012, filed Dec. 12, 1963, now abandoned.

This invention relates to a method of growing soybeans for seed yield, and, more particularly, to a method of increasing or maximizing the harvestable seed yield under field growing conditions. The method of this invention is also applicable to edible beans and edible peas.

The principal object of the present invention is to provide a method of increasing the harvestable yield of soybeans. It is desired to accomplish this objective by increasing the number or size of the soybeans formed on each soybean plant. Alternatively or additionally, it is an object to increase soybean yield by growing more soybean plants per acre, that is, by increasing plant population, without at the same time decreasing the per plant soybean yield, or at least obtaining an overall net increase in soybean yield. Another related object is to provide a method which is applicable under stress conditions, such as when the plants are subjected to unusually dry weather especially during the period of bean formation, to maintain the soybean yield at a high level or at least prevent a decrease in yield which might otherwise be caused by the stress conditions. Still another object is to increase the harvestable bean yield by preventing or minimizing lodging, which refers to the known tendency of soybean plants to fall or lean over as the plants mature.

This invention is based on several interrelated discoveries. One of these discoveries is that it is possible to utilize an antiauxin, such as 2,3,5-triiodobenzoic acid, to increase harvestable soybean yield. Thus in the experimental work leading to the present invention, it was further discovered that the desired result of increasing soybean yield can be accomplished most effectively when the antiauxin is applied to the plants during a particular period or stage in their growth. It was also discovered that the concentration of the antiauxin is of considerable importance in maximizing the increased seed yield without at the same time unduly retarding the general growth of the plant. Still another discovery is that the method has particular value where it is desired to utilize a relatively high plant population, which otherwise might result in undue crowding of the plants with a reduction in overall soybean yield. It has also been discovered that the method is of particular value when the growing plants are subjected or may be subjected to stress conditions, such as a prolonged period of dry weather, storm or hail damage, low fertility soils, or other unfavorable growing conditions. A further discovery relates to the action of the antiauxin, such as 2,3,5-triiodobenzoic acid, in preventing or minimizing lodging, and thereby providing a further increase in the harvestable beans. It has been found that soybean plants treated in accordance with the present invention tend toward a distinctive conical or pine tree shape, as contrasted with the usual top heavy shape, and that the leaves tend to assume an attitude more nearly vertical than the usual roughly horizontal attitude.

On the basis of prior knowledge, the results obtained by the method of the present invention are new, unexpected, and surprising. While a number of investigators have studied the effect of antiauxin treatment on the flowering of soybeans, the reported observations suggested no practical or commercial value for such treatment. (See Galston, Am. J. Botany, 34: 356–360, 1947; and Fisher and Loomis, Science ,11: 71–73, 1954.) For example, Galston reported that antiauxin treatment could induce flowering during non-inductive photo-periods, or increase bud formation under minimum photoinduction but there is no relationship in soybeans between flowering or even the number of flowers produced and the number of pods set or seed yield. (See van Schaik and Probst, Agron. J. 50: 192–197, 1958.) Moreover, Galston also reported that the antiauxin treatments resulted in a decrease in plant dry matter, indicating a retardation of plant growth, which would be expected to have a deleterious effect on seed yield. As far as applicant is aware, the only practical use heretofore proposed for antiauxins in the raising of soybeans is pre-emergence herbicides. (See Sutherland et al., Northeast Weed Control Conference Proceedings 14: 31–39, 1960.) However, Sutherland et al. observed that the contacting of an antiauxin with the growing soybean plants as it was applied to the soil for weed control had the harmful effects of reducing the fresh weight of the aerial parts of the plants, and also the height of the plants. Sutherland et al. were therefore attempting to find antiauxins which minimized these undesirable effects, thereby facilitating the proposed use of antiauxins as pre-emergence herbicides in soybean cropping practice.

Antiauxins are a known class of plant growth regulators which have the property of inhibiting or arresting cell elongation in plants. The compound 2,3,5-triiodobenzoic acid, sometimes referred to as TIBA, is probably the best known and most readily available antiauxin, and it is therefore preferred for use in practicing the present invention. However, it will be apparent to those skilled in the art that other antiauxins can be substituted at equivalent concentrations. The antiauxin-active, polyhalogenated benzoic acid compounds include 2,3,5-trichlorobenzoic acid, 2,5-dichloronitrobenzoic acid, 2,3,6-trichlorobenzoic acid, 2,3,5,6-tetrachlorobenzoic acid, 2,5-dichlorobenzoic acid, and others of lesser activity. N–1 naphthylphthalmic acid is an example of a closely related compound having antiauxin activity.

TIBA or equivalent antiauxin may be used in the form of derivatives which retain their biological activity, such as the salts, amides, or esters thereof. Since the acid or its anions are the active biological moiety, it is evident that any derivative or salt which yields the acid or anion through contact with the plant, ground or atmosphere may be used. Thus, the esters, thioesters, amides, anhydrides, thioanhydrides, halides, iminoesters and nitriles of TIBA or other antiauxin active acids may be used. TIBA and the biologically active derivatives thereof may be conveniently referred to herein as antiauxin active TIBA compounds.

While all of the above derivatives and salts of the 2,3,5-triiodobenzoic acid are operable as yield increasing agents, being antiauxin active since they are converted to the acid or its anion, some groups of compositions are preferred to others for particular types of application and methods of treatment, for reasons of cost, optimal effectiveness, safety, and ease of application.

For instance, where an aqueous foliar spray is to be used, salts, preferably water-soluble salts, are desirable. Examples of suitable salts include but are not limited to sodium, potassium, lithium, calcium, magnesium, strontium, iron, zinc, nickel, chromium, ammonium, hydroxylammonium, hydrazinium, mono-, di-, tri- and tetraalkylammonium such as monomethylammonium, monoethylammonium, dimethyl-, diethyl-, dipropyl-, dibutylammonium, trimethyl-, tetramethyl-, triethyl-, tripropyl, tributylammonium salts; also the mono-, di- and triethanolammonium and mono-, di-, and tri-propanolammonium, salts of the aforesaid 2,3,5-triiodobenzoic acid. The preferred method for foliar application is the use of a water-soluble composition selected from the group consisting of the sodium, potassium, lithium, ammonium, monoalkylammonium, dialkylammonium, trialkylammonium, tetraalkylammonium, monoalkanolammonium, dialkanolammonium, trialkanolammonium, tetraalkanolammonium, morpholinium, and piperidinum salts of the aforementioned 2,3,5-triiodobenzoic acid, water and optional conditioning adjuvants.

However, oil-soluble derivatives may be employed in powder carriers, in organic carrier, or in aqueous dispersions. These oil-soluble derivatives are especially valuable when made up in organic solvents such as higher alcohols, ketones, esters, and especially mineral and vegetable oils having relatively low phytotoxicity, since these formulations particularly enhance adherence of the compounds to leaf surfaces. Examples of suitable esters include among many others: methyl, ethyl, propyl, isopropyl, butyl, isobutyls, amyl, isoamyls, hexyl, isohexyls, heptyl, isoheptyls, octyl, isooctyls, ethylhexyl, nonyl, isononyl, decyl, isodecyls, cyclopentyl, cyclohexyl, allyl, lauryl, 1,2-ethylenebis, 2-chloroethyl, glyceryl (mono-, bis- or tris-), methoxyethyl, ethoxyethyl, butoxyethyl, ethoxyethoxyethyl, butoxyethoxyethyl, tetrahydrofurfuryl, benzyl.

Examples of oil-soluble amines are those possessing about six or more carbon atoms, such as for example, tripropyl, dibutyl, tributyl, cyclohexyl, hexyl, diamyl, triamyl, dihexyl, dioctyl, trioctyl, ethylhexyl, di(2-ethylhexyl), decyl, didecyl, tridecyl, lauryl, dilauryl, trilauryl, methyl lauryl, dimethyl lauryl, stearyl, dimethylstearyl amines, also coco-, tallow-, and rosin-amines.

In practicing the method of this invention, the antiauxin active TIBA compound is preferably applied to the growing soybean plants in an aqueous solution, dispersion, or emulsion. However, other liquid or solid carriers can be used. Where the TIBA compound or other antiauxin is difficultly soluble or dispersible in water, it can first be dissolved in an alcohol, such as methanol or ethanol, to form a concentrated solution which is then mixed with the much larger volume of water to form a dispersion or solution of the desired concentration. As used herein, the term "dispersion" is intended to cover true solutions, colloidal dispersions, and emulsions where the antiauxin is dissolved or dispersed therein.

The concentration of TIBA or other antiauxin in the aqueous dispersion is important in achieving the results of the present invention, since the concentration is a direct measure of the amount of antiauxin applied per plant for a given quantity of the aqueous dispersion. Usually, where the spray is applied to runoff a concentration of at least 5 to 10 parts per million (p.p.m.) of the TIBA compound is required. On the basis of the available date, it is believed that the optimum concentration for a single application is within the range from about 10 to 60 p.p.m., assuming application is to runoff and in an aqueous carrier. It is undesirable to employ such a high concentration of the antiauxin that the general growth of the plant is retarded to the point that the plants are no longer vigorous and healthy. Usually, an aqueous dispersion containing up to 120 p.p.m. of the TIBA compound would not cause serious adverse effects. However, in the preferred embodiments of the present invention, the aqueous dispersion when applied to runoff will usually contain not over 90 p.p.m. of the TIBA compound or other equivalent antiauxin. If more than one application is made, proportionately lesser quantities or concentrations may be used, but the total quantity of the antiauxin applied should approximate that achieved by the concentrations level specified for single application treatment. It is also feasible to use a more concentrated aqueous solution where the application is limited to only part of the plant surfaces or where the application is such as to only partially wet the plant leaves.

The above ranges in p.p.m. for the TIBA compound in aqueous solution applied to runoff will on the average result in approximately the following dose levels per soybean plant when specified in micrograms of the TIBA compound:

| P.p.m.: | Mcg./plant |
| --- | --- |
| 5 | 21 |
| 10 | 42 |
| 60 | 250 |
| 90 | 375 |
| 120 | 500 |

Consequently, the preferred treatment range of 10 to 60 p.p.m. corresponds to about 42 to 250 mcg. per plant, while the broader range of 5 to 120 p.p.m. corresponds to about 21 to 500 mcg. per plant.

While the theoretical explanation of the method of the present invention has not been conclusively verified, it appears to invoice a mechanism whereby the general growth of the plant, that is, the growth of the stems and leaves, is temporarily arrested or inhibited during the period of growth in which the beans are being formed, and this permits the vital energy of the plant to be directed more fully to bean formation, and thereby an increased number of bean pods per plant. An apparent consequence of this mechanism is that the plants are better able to withstand drought conditions or other stress conditions during the period of bean formation without resulting in the reduction of the size or number of the bean pods. Presumably, this indicates that the available growth energy of the plant, which is lessened due to the stress conditions, is still sufficient for normal or even superior bean pod formation, since it is directed more fully to this purpose rather than to the growth of the leaves and stems. Another consequence is that the treated soybean plants, although remaining vigorous and healthy plants, do not achieve the same size when fully mature, that is, the plants tend to be somewhat shorter and to have a smaller lateral extent. This reduction in plant size is achieved without sacrificing bean yield, and even with an increase in bean yield, and is accompanied by notable freedom from lodging. Consequently, it is possible, at least under some circumstances, to increase the average plant population as compared with the optimum population for untreated plants, and thereby obtain a further increase in overall bean yield.

There is evidence that the antiauxin treatment causes the plants to be more efficient in the utilization of solar energy for photosynthesis. The young leaves of the treated plants are smaller in size and tend to be oriented in a more vertical position than for comparable leaves of untreated plants. The young petioles also are shorter in length. Moreover, the treated plants have a different shape than those of untreated plants. Plants treated with TIBA according to the present invention have a triangular or Christmas tree shape whereas untreated plants have a more rectangular shape. The crop surface, exposed to sunlight, of untreated plants tends to be rather flat with many large leaves parallel to the soil surface by the time ground cover is obtained. A flat-broad-leafed surface is relatively inefficient in the utilization of solar energy because the leaves absorb the major fraction of the intensity of full sunlight but photosynthesis by an individual leaf nearby is saturated by approximately one-fourth the intensity of full sunlight. The rate of photosynthesis per unit of light energy decreases with increasing intensity. The more irregular surface (Christmas tree shape), rather vertically oriented young leaves, and smaller sized leaves of plants treated with TIBA should allow a more efficient utilization of available solar energy for photosynthesis and dry matter production. The Christmas tree shape also tends to make the plants more stable, thereby preventing or minimizing lodging, and providing more harvestable beans by avoiding rotting of beans on the ground and loss of beans on the lower branches during harvesting.

In achieving the above objects and results, it is desirable to apply the antiauxin to the plants after they have achieved substantial leaf growth but before the plants are in full flower. For example, the treatment may be carried out immediately prior to or during the early stages of the flowering of the plants.

The morphology of soybean plants has been subjected to systematic analysis and classification for other purposes, as reported, for example, in The Iowa Agricultural Experiment Station Research Bulletin No. 359, published January 1949. Page 745 of this bulletin sets out in tabular form an idealized classification of the various growth stages of Northern soybean plants from Stage 1 to Stage 10. In terms of the classifiication there set forth, the optimum growth phase for applying the antiauxin according to the method of the present invention is Stage 3, which is characterized by having from 5 to 6 tri-foliate leaves expanded or unrolled, and with the plants just beginning to flower, as evidenced by from about 1 to 5% of the plants undergoing initial flowering. However, trifoliate leaf development does enot always correlate in the same way with flowering. More generallly, the method of this invention can be applied during the growth periods when the soybean plants have 3 or more trifoliate leaves expanded up to the period when substantially all of the plants are flowering. This will correspond generally to the periods from growth Stage 2 up to the beginning of growth Stage 5, as defined in the classification of the cited publication. Preferably, the treatment should be completed before the majority of the plants are flowering.

Following the antiauxin treatment, the plants are permitted to continue to grow through the stage of full flower and until the beans are mature for harvesting. The beans are then harvested to complete the method of this invention.

In practicing the method of the invention according to the procedures just described, there appears to be a mild suppression of the shoot apex, while at the same time the formation of the bean pods and beans is promoted. As indicated, this may lead to increased bean yield either on a per plant basis, or overall yield due to increased plant population, and the degree of yield response may be somewhat more marked where the plants are subjected to stress conditions during the period of bean formation. An accentuated yield response may also be obtained where the soybeans are being grown in relatively poor soil or where less than the optimum quantity of fertilizer has been applied to the soil. Consequently, the method of this invention can be expected to be of great utility in the growing of soybeans under a wide variety of field conditions.

The method of this invention provides maximum benefits with Northern soybean varieties, especially midseason or late varieties for the particular locality. Northern soybeans are characterized by an indeterminate growth pattern, whereas Southern soybean varieties are usually classified as having a determinate growth pattern. The yield increase under usual field conditions appears to be more marked with soybean varieties having an indeterminant growth pattern, but both Southern and Northern varieties are benefited by the treatment, since the treated plants assume the distinctive Christmas tree shape, which reduces lodging and thereby tends to increase the recoverable beans.

The method of this invention is further illustrated by the following examples:

Example 1

The Hawkeye variety of soybeans (a Northern variety) was planted on a rather uniform soil in rows 40 inches apart with an average of 10 plants per foot of row being established. This resulted in an average plant population of around 130,000 plants per acre, there being approximately 10 plants per row-foot and about 13,000 row-feet per acre. More exactly, the plant population calculates out at 130,680 plants per acre. Forty-eight 20-foot sections of rows were marked off in as near a square-shaped area as possible for the experiment. The rows in the experiment were divided into four areas (replications) with the 12 rows in each replication. A treatment plot consisted of three adjacent rows, which made four treatment plots in each replication. The 4 treatments were designated as follows: 0, 15, 30 and 150 p.p.m. of TIBA (2,3,5-triiodobenzoic acid).

When the majority of the plants had 5 to 6 trifoliate leaves expanded with about 1 to 5% of the plants beginning to flower, the treatments were started. The total amounts or levels of antiauxin treatments were divided into 3 equal applications, that is, 0, 5, 10 and 50 p.p.m. of TIBA were applied three times in order to result in a total treatment of 0, 15, 30 and 150 p.p.m. of TIBA, respectively. The second application of the treatments was applied four days after the first, and the third application three days after that. Each application consisted of spraying the foliage of the plants to the point where the solutions began dripping from the leaves using a low pressure hand sprayer containing the appropriate solution.

In preparation for spraying the plants, a concentrated stock solution of TIBA was made by dissolving 10 grams of 2,3,5-triiodobenzoic acid to a volume of 1000 milliliters (ml.) 95% ethyl alcohol. In preparing the solution for application to the plants, 0, 5, 10 and 50 ml. of the stock solution of TIBA were added to sprayers each containing 10 liters of water and 0.5 ml. of Tween "20" (non-ionic surfactant) for application to the 0, 15, 30 and 150 p.p.m. TIBA treatment plots, respectively. Approximately 2.5 liters of each solution were required to spray a plot consistng of three rows each 20 feet long. As mentioned previously, each treatment plot was sprayed three times. In equivalent terms, approximately 0, 8, 16 and 80 grams of TIBA would have been applied per acre for the 0, 15, 30 and 150 p.p.m. of TIBA treatments, respectively. More exactly, the corresponding figures are 0, 8.2, 16.3 and 81.7 grams per acre.

The plants were cultivated with a tractor and also hand weeded. After the plants had matured, the middle 16-foot section of the center row of each plot was harvested and the seed yield per acre was calculated. The yields of a treatment in each of the 4 replications were averaged. The yields in terms of bushels per acre were 36.6, 40.7, 41.4 and 29.1 for the 0, 15, 30 and 150 p.p.m. TIBA treatments respectively. The plants in this experiment were grown on medium productive soil and lodging was not a problem.

The micrograms of TIBA applied per acre or per plant at each level used in the test can be readily calculated from the p.p.m. figures. The correlation is as follows:

| p.p.m. | g./acre | mcg./plant |
|---|---|---|
| 0 | 0 | 0 |
| 15 | 8.2 | 62.5 |
| 30 | 16.3 | 125 |
| 150 | 81.7 | 625 |

On the same basis, the g./acre and mcg./plant corresponding to 5, 30, 60 and 120 p.p.m. TIBA applied to run-off is:

| p.p.m. | g./acre | mcg./plant |
|---|---|---|
| 5 | 2.7 | 20.8 |
| 10 | 5.4 | 41.7 |
| 60 | 32.7 | 250 |
| 120 | 65.3 | 500 |

It will be apparent that the treatment levels expressed in mcg./plant do not depend on any particular application procedure or on any particular plant population. However, it may be convenient, to control the applications rates in terms of p.p.m. if the spray is applied to run-off, or in g./acre where a more concentrated spray is used which only partially wets the plants.

*Example 2*

In another experiment, which was conducted following the general procedure of Example 1, the number of applications and the rate of TIBA were varied. The plants (Hawkeye variety at about 130,000 per acre) in this experimental field reached the growth stage where 5 to 6 trifoliate leaves were expanded and 1 to 5% flowering at the beginning of the treatments. When the chemical treatment was divided into 3 or 6 applications, the plants were sprayed at 3 or 4 day intervals. Some of the plots were sprayed only once, which coincided with the second spraying for the multiple application plots. Table A presents the mean yields results from six replications:

TABLE A

| TIBA treatment | | | Number of applications | Rate per application, p.p.m. of TIBA | Seed yield, bu./acre | Lodging Score |
| --- | --- | --- | --- | --- | --- | --- |
| p.p.m. | mcg./plant | g./acre | | | | |
| 0   | 0    | 0    | ---- | ---- | 34.3 | 4.4 |
| 15  | 62.5 | 8.2  | 1 | 15  | 37.4 | 3.8 |
| 15  | 62.5 | 8.2  | 3 | 5   | 37.5 | 4.0 |
| 15  | 62.5 | 8.2  | 6 | 2.5 | 38.1 | 3.4 |
| 30  | 125  | 16.3 | 1 | 30  | 40.9 | 3.6 |
| 30  | 125  | 16.3 | 3 | 10  | 37.4 | 3.4 |
| 30  | 125  | 16.3 | 6 | 5   | 38.7 | 2.7 |
| 60  | 250  | 32.7 | 1 | 60  | 39.5 | 3.0 |
| 60  | 250  | 32.7 | 3 | 20  | 41.0 | 2.1 |
| 60  | 250  | 32.7 | 6 | 10  | 38.7 | 1.8 |
| 120 | 500  | 65.3 | 1 | 120 | 39.2 | 1.6 |
| 120 | 500  | 65.3 | 3 | 40  | 37.0 | 1.7 |
| 120 | 500  | 65.3 | 6 | 20  | 39.3 | 1.8 |

The plants in the experiment of Table A were grown on highly productive soil. A rain and strong wind storm during July flattened plants in this field unless treated with TIBA. The lodging scores, taken at time of harvest, are visual rankings between 1, all plants erect, to 5, all plants prostrate.

*Example 3*

Another experiment was conducted following a procedure similar to the foregoing examples, except that the soybean plants (Hawkeye variety) were grown in rows 20 inches apart, giving a plant population of around 260,000 per acre. This high plant population tends to cause an undesirable amount of lodging by the control plants, which helped to demonstrate the value of the TIBA treatment. The results obtained are shown below in Table B.

TABLE B

| One application of TIBA (p.p.m.) | Seed Yield (bu./acre) | Number of Seed (million/acre) | Size of Seed (grams/100) | Plant Height at Maturity (inches) | Lodging Score (1 to 5) |
| --- | --- | --- | --- | --- | --- |
| 0  | 38.0 | 5.9 | 17.3 | 48 | 3.6 |
| 30 | 40.7 | 7.2 | 15.5 | 44 | 2.7 |
| 60 | 42.3 | 7.7 | 15.0 | 43 | 1.7 |
| 90 | 39.5 | 7.4 | 14.4 | 38 | 1.5 |

*Example 4*

For purposes of convenience, a concentrated stock solution of 2, 3, 5 triiodobenzoic acid (TIBA) can be made by dissolving 10 grams of TIBA in 95% ethyl alcohol to a volume of 1000 ml. The stock solution of TIBA is stored in a brown bottle in order to protect it from a possible light deterioration.

To make a solution for spraying the plants, a measured volume of the stock solution is added to a measured volume of water containing a measured volume of a detergent or wetting agent. For example, in order to make 10 liters of a solution containing 45 p.p.m. of TIBA, 45 milliliters of the stock solution is pipetted into the tank of a hand sprayer containing 10 liters of water and 0.5 milliliter of Tween 20, which is a non-ionic surfactant.

The spray having a TIBA concentration of 45 p.p.m. is then applied by a pressure sprayer to the soybean plants at the onset of flowering, the application technique being such that the leaves are substantially wetted.

As indicated by the foregoing examples, the antiauxin can be applied to the plants by first forming an aqueous dispersion, and then spraying the aqueous dispersion on the plants, a sufficient quantity of the spray being applied so that all of the plant leaves are fully wetted. After the plant leaves have been fully wetted with the dispersion, any excess of the spray will run off, and this will tend to control the quantity of the spray applied to each plant. If desired, a wetting agent, such as a non-ionic surfactant, may be included in the spray to promote uniform spreading on the plant leaves. Other methods of application can be used. For example, the antiauxin powder can be uniformly dispersed in an inert carrier powder, which is then applied to the plants by dusting. Another alternative is to use aqueous dispersions of higher concentrations which are applied so as to only partially wet the plant leaves. This procedure has the advantage of requiring less time to spray an acre.

When using dusting powder or a more concentrated solution for applying the antiauxin, reasonably accurate dose levels per plant can be maintained by controlling the grams of antiauxin per acre in relation to the plant population. It should be kept in mind that the usual or normal plant population for 40 inch rows is about 130,000 plants per acre. By using 20 inch rows, the plant population can be increased to around 260,000. With drill planting, a population of 325,000 or more plants per acre can be achieved. In general, the optimum grams per acre application rate will increase proportionately with increasing plant population. For example, the use of 260,000 plants per acre will require nearly two times as much TIBA per acre as required for a plant population of 130,000 per acre. However, some other factors may affect the optimum dose level for a specific field condition. These factors include soil, climate, row width, variety of soybeans, and date of planting, some or all of which may affect the vegetative size of the plants at the time of treatment.

The optimum dose in mcg./plant will tend to increase with plant size, as will the treatment level in g./acre. Nevertheless, the optimum dose will usually fall within the dosage ranges (usually within the preferred ranges) previously set out.

In the foregoing disclosure, reference has been made to applying the invention under conditions wherein the planting pattern results in a relatively high plant population. To those skilled in the art, it will be apparent that an increased plant population may be obtained by utilizing more closely spaced rows, or by spacing the plants more closely within each row, or both, or by using drill planting. In the growing of soybeans in the United States, a 40-inch row spacing is considered to be normal, that is, the distance between each row is approximately 40 inches under normal planting techniques. Consequently, this invention is deemed to be especially applicable when the plants are arranged in rows more closely spaced than 40 inches, such as 30-inch or 20-inch rows.

Normally the plants are spaced within the row at about 8 to 10 plants per foot. A spacing of 4 plants per foot is considered to be relatively low, while a spacing of 16 plants per foot is considered to be relatively high. Consequently, the present invention is deemed to be particularly applicable to plant spacings of greater than 8 plants per foot up to at least 16 plants per foot. As indicated, the closer spacing within each row may be employed either alone or in conjunction with a closer spacing between rows in order to achieve an overall high plant population. In terms of plant population, the method of this invention is especially applicable for populations ranging from about 100,000 to 500,000 plants per acre.

Other crops susceptible to treatment in accordance with this invention are edible beans including snap beans, and edible peas. Beans and peas susceptible to treatment in accordance with this invention include those of the genus Phaseolus Leguminosae, such as bush beans and pole beans. While the invention has been described in detail with reference to soybeans, it should be understood that the teachings are also applicable to the growing of edible beans and edible peas. Dose levels of about 21 to 500, or preferably about 42 to 250, mcg./plant can be used. As previously explained where the spray is applied to runoff, these doses may be expressed as 5 to 120, or preferably 10 to 60 p.p.m. in the spray, which is preferably an aqueous spray. As with soybeans, the treatment is carried out at a growth stage when the edible beans or peas have achieved substantial leaf growth but before the plants are in full flower.

Specific examples are:

*Example 5*

An aqueous spray is prepared as described in Example 4 containing 45 p.p.m. of TIBA. This spray is then applied to run-off to edible beans (viz. white or navy beans) at the onset of flowering. This approximates a dose level of about 175–200 mcg. per plant. The plants are permitted to continue to grow in the usual way until the beans are ready for harvest, and the beans are then harvested in the usual way.

*Example 6*

The procedure described in Example 5 is also applicable to edible peas. The aqueous solution containing 45 p.p.m. of TIBA is applied to the edible pea plants at the onset of flowering, the spray being applied to run-off. This approximates a dose level of about 175–200 mcg. per plant. The pea plants are permitted to continue to grow and then harvested in the usual way.

While in the foregoing specification this invention has been described in relation to certain preferred embodiments thereof and many details have been set forth for the purpose of illustration, it will be apparent to those skilled in the art that the invention is susceptible to additional embodiments and that certain of the details set forth herein can be varied considerably without departing from the basic principles of the invention.

I claim:

1. The method of raising soybean plants for seed yield, comprising growing soybean plants under outdoor field conditions, applying a TIBA compound to said growing soybean plants at a growth stage when said plants have more than three trifoliate leaves expanded up to a growth stage characterized by full flowering of said plants, said TIBA compound being selected from 2,3,5-triiodobenzoic acid and antiauxin active derivatives thereof, said TIBA compound being applied at a total dose level averaging at least 21 micrograms of said compound per plant up to 250 micrograms per plant, continuing to grow said plants until the seeds formed thereon are ripe for harvest, and harvesting the seeds from said plants.

2. The method of claim 1 wherein said TIBA compound is applied at a growth stage characterized by said plants having at least five trifoliate leaves expanded and at a dose level averaging at least 42 micrograms of said compound per plant.

3. The method of raising soybean plants for seed yield, comprising growing soybean plants under outdoor field conditions, said soybean plants being a Northern soybean variety classified as not earlier than midseason and having an indeterminate growth pattern, applying a TIBA compound to said growing soybean plants at a growth stage characterized by the onset of flowering of said plants and when said plants have at least five trifoliate leaves expanded, said TIBA compound being selected from 2,3,5-triiodobenzoic acid and antiauxin active derivatives thereof, said TIBA compound being applied at a dose level averaging from at least 21 up to about 250 micrograms of said compound per plant, continuing to grow said plants until the seeds formed thereon are ripe for harvest, and harvesting the seeds from said plants.

4. The method of raising soybean plants for seed yield, comprising growing soybean plants under outdoor field conditions, applying a TIBA compound to said growing soybean plants at a growth stage when said plants have more than three trifoliate leaves expanded up to a growth stage characterized by full flowering of said plants, said TIBA compound being selected from 2,3,5-triiodobenzoic acid and antiauxin active derivatives thereof, said TIBA compound being applied at a dose level approximating the dose level per plant obtained by spraying an aqueous dispersion containing at least 5 up to about 60 p.p.m. of said compound until the leaves of the plants are substantially completely wetted, continuing to grow said plants until the seeds formed thereon are ripe for harvest, and harvesting the seeds from said plants.

5. The method of raising soybean plants for seed yield, comprising growing soybean plants under outdoor field conditions, said soybean plants being a Northern soybean variety classified as not earlier than midseason and having an indeterminate growth pattern, applying a TIBA compound to said growing soybean plants at a growth stage characterized by the onset of flowering of said plants and when said plants have at least five trifoliate leaves expanded, said TIBA compound being selected from 2,3,5-triiodobenzoic acid and antiauxin active derivative thereof, said TIBA compound being applied at a dose level approximating the dose level per plant obtained by spraying an aqueous dispersion containing at least 5 up to about 60 p.p.m. of said compound until the leaves of the plants are substantially completely wetted, continuing to grow said plants until the seeds formed thereon are ripe for harvest, and harvesting the seeds from said plants.

6. The method of raising soybean plants for seed yield, comprising growing soybean plants under outdoor field conditions, said plants having a planting pattern resulting in a plant population substantially higher than 130,000 plants per acre applying a TIBA compound to said growing soybean plants at a growth stage when said plants have more than three trifoliate leaves expanded up to a growth stage characterized by full flowering of said plants, said TIBA compound being selected from 2,3,5-triiodobenzoic acid and antiauxin active derivatives thereof, said TIBA compound being applied at a dose level averaging at least 21 micrograms of said compound per plant up to 250 micrograms per plant, continuing to grow said plants until the seeds formed thereon are ripe for harvest, and harvesting the seeds from said plants.

7. The method of claim 6 wherein said plants are arranged in rows having a spacing between rows of not substantially greater than 30 inches.

8. The method of claim 6 wherein said plants are arranged in rows, the plants within a particular row being substantially more closely spaced than 8 plants per foot.

9. The method of claim 6 wherein said planting pattern results in a plant population of at least about 260,000 plants per acre.

10. The method of raising edible bean plants, comprising growing bean plants under outdoor field conditions, applying a TIBA compound to said growing edible bean plants at a growth stage when said plants have more than three trifoliate leaves expanded up to a growth stage characterized by full flowering of said plants, said TIBA compound being selected from 2,3,5-triiodobenzoic acid and antiauxin active derivatives thereof, said TIBA compound being applied at a total dose level averaging at least 21 micrograms of said compound per plant up to 250 micrograms per plant, continuing to grow said plants until the beans formed thereon are ripe for harvest, and harvesting said beans from said plants.

11. The method of claim 10 wherein said TIBA compound is applied at a growth stage characterized by the onset of flowering, and at a dose level averaging at least 42 micrograms of said compound per plant.

12. The method of raising edible pea plants, comprising growing edible pea plants under outdoor field conditions applying a TIBA compound to said growing pea plants at a growth stage when said plants have more than three trifoliate leaves expanded up to a growth stage characterized by the full flowering of said plants, said TIBA compound being selected from 2,3,5-triiodobenzoic acid and antiauxin active derivates thereof, said TIBO compound being applied at a total dose level averaging at least from 21 micrograms of said compound per plant up to 250 micrograms per plant, continuing to grow said plants until the peas formed thereon are ripe for harvest, and harvesting the peas from said plants.

13. The method of claim 12 wherein said TIBA compound is applied at growth stage characterized by the onset of flowering, and at a dose level averaging at least 42 micrograms of said compound per plant.

References Cited

Galston: Am. J. Botany, vol. 34, pp. 356 to 360 (1947).
Weaver et al.: Botanical Gazette, vol. 107, pp. 565 to 568 (1946).

LEWIS GOTTS, *Primary Examiner.*

JAMES O. THOMAS, JR., *Examiner.*

A. J. ADAMCIK, *Assistant Examiner.*